UNITED STATES PATENT OFFICE.

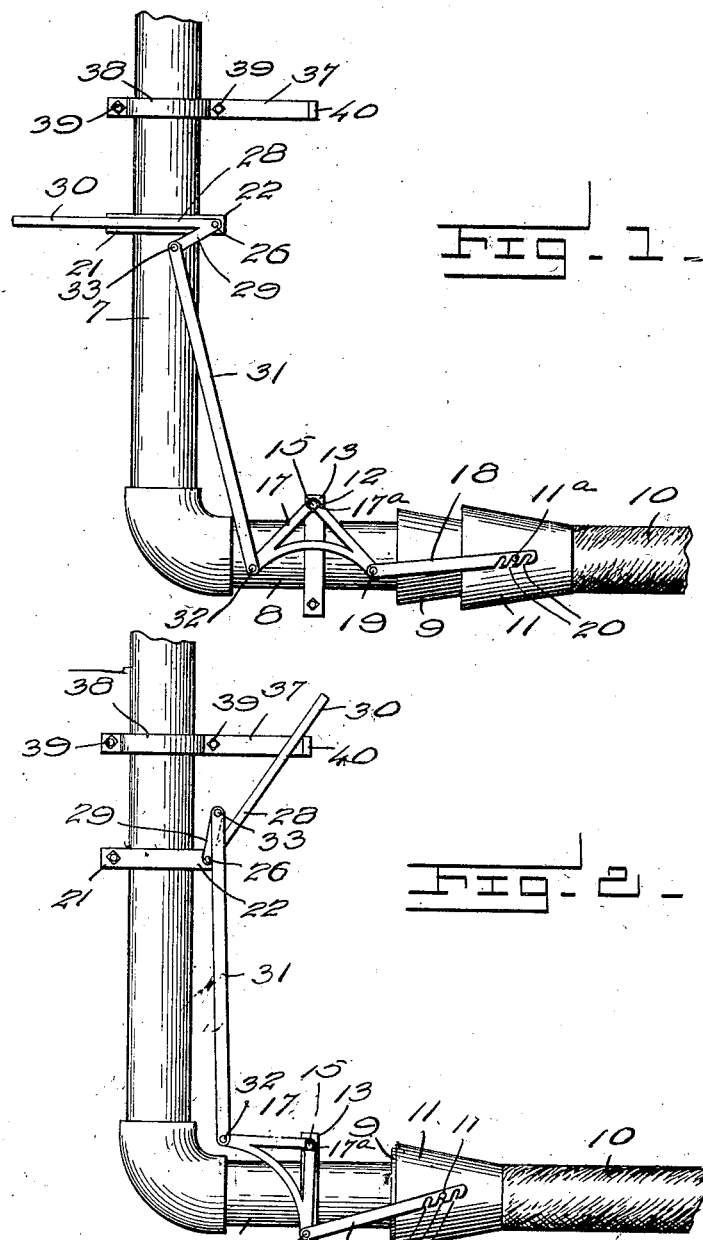

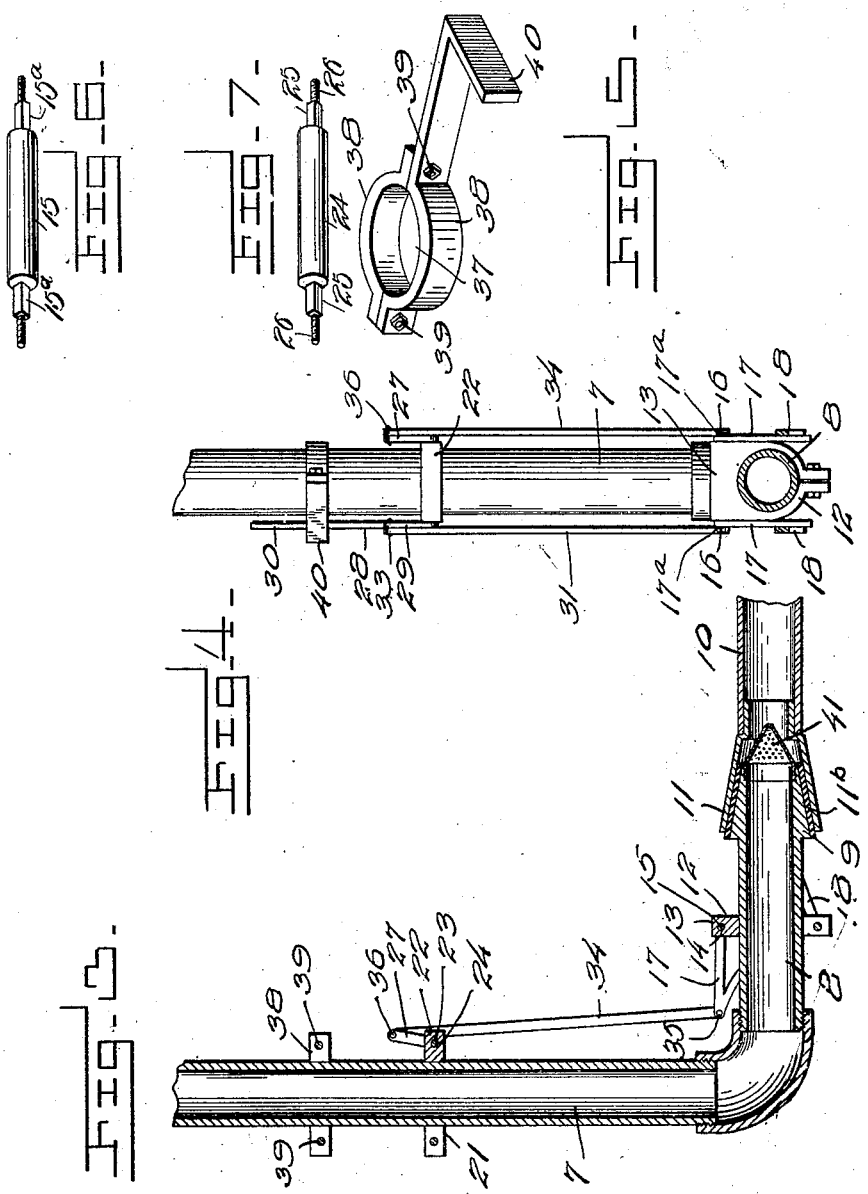

PAUL W. LANGILLE, OF LUNENBURG, NOVA SCOTIA, CANADA.

HOSE-COUPLING.

1,070,822.  Specification of Letters Patent.  Patented Aug. 19, 1913.

Application filed November 7, 1911. Serial No. 658,950.

*To all whom it may concern:*

Be it known that I, PAUL W. LANGILLE, a subject of the King of Great Britain, residing at Lunenburg, in the Province of Nova Scotia and Dominion of Canada, have invented certain new and useful Improvements in Hose-Couplers, of which the following is a specification.

This invention relates to an improvement in hose-couplings especially adapted for use in connection with locomotives although the invention may be used with equal success in hose-couplings of various types.

The principal object of this invention is to provide a novel means for quickly clamping two sections of hose together with a minimum amount of labor.

Another object of the invention is to provide a clamping means for the purpose set forth which can be locked by the swinging of a lever in the opposite direction.

A further object of the invention is to provide a coupling of the character described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a side elevation of a hose coupler constructed in accordance with my invention, the view showing the parts in their unlocked positions, Fig. 2 is a similar view but showing the parts in their locked positions, Fig. 3 is a longitudinal sectional view through the same, Fig. 4 is a sectional view taken on the line 4—4 of Fig. 2. Fig. 5 is a perspective view of the stop element. Figs. 6 and 7 are detail perspective views of certain shafts used herewith.

Like reference numerals designate corresponding parts in all the figures of the drawings.

Referring to the drawings, 7 designates a normally vertical feed pipe having a lateral extension 8 at its lower end. The extreme end of this extension is formed with a conical head 9, constituting a male end, the small end thereof being located at the end of the extension. Adapted to be supported by a tender by any suitable means is a hose 10 having an enlarged connecting female end 11 of a shape corresponding to the head 9 and adapted to fit thereover, said end being provided with diametrically opposed pins 11$^a$—11$^a$. Disposed between the head 9 and the end and secured to the former, is a packing element 11$^b$ of rubber or any other suitable material.

Disposed around the extension 8 is a clamp 12 having a thickened connecting portion 13 which is formed with an opening 14 extending transversely of said extension. Loosely mounted in said opening 14 is a rock shaft 15 having reduced angular end portions 15—15 which project beyond the extension 8 and threaded ends 16—16. Bell-crank levers 17—17 are respectively secured at their angles to the angular end portions 15—15 of said shaft, and nuts 17$^a$—17$^a$ are associated with the ends 16—16. Links 18—18 are each pivotally connected at one end as at 19 to the end of the adjacent arm of the lever 17, and has its other end formed with a plurality of notches 20 adapted to engage the respective pin 11$^a$ of the hose 10.
Disposed around the feed pipe 7 above the extension 8 is a clamp 21 having a thickened connecting portion 22 which is formed with an opening 23 extending transversely of the pipe 8 and disposed in a plane parallel to the rock shaft 15 before mentioned. Loosely mounted in the opening 23 is a rock shaft 24 having reduced angular end portions 25—25 which project beyond the pipe 7 and threaded ends 26—26.
A rocker arm 27 is secured at one end to one end portion 25 of the shaft 24, and a V-shaped lever 28 is connected at its angle to the other end portion 25 of said shaft. One arm 29 of this lever constitutes a rocker arm and the other arm 30 a hand lever. A link 31 is pivotally connected at one end, as at 32, to the free end of the adjacent arm of the adjacent bell-crank lever 17 and at its other end as at 33 to the free end of the rocker arm 29 of the lever 28. A second link 34 is pivotally connected at one end, as at 35, to the free end of the adjacent arm of the other bell-crank lever 17 and at its other end as at 36 to the free end of the rocker arm 27. It will thus be observed that when the hand lever 30 is lifted, the shaft 24 will be rocked, and as a result, the arms 27 and 29 which are disposed in the same plane, will also be lifted, thereby simultaneously pulling on the links 31 and 34 and consequently swinging the bell-crank levers 17—17. These levers, through the medium of the links 18—18, pull the connecting end 11 of the hose 10 around the head 9 of the extension 8, the packing element 11$^b$ rendering the coupling water tight. The hand lever 30 is swung until arms 27 and 29 are beyond their center line, and in order to prevent the lever 30 from further swinging, there is provided a stop element 37. This element has one end bifurcated to form clamping arms 38—38 which surround the pipe 7 above the clamp 21, and are secured by a bolt 39 or other suitable means. This element extends laterally above the extension 8 of the pipe 7, and terminates in a short arm 40 which projects in the path of movement of said hand lever 30 to form a stop therefor.

Secured to the head 9 of the extension 8, and projecting into the end 11 of the hose 10 is a strainer 41 of any suitable construction.

What is claimed is:

1. In combination with pipe sections respectively including male and female ends, a bell-crank lever fulcrumed upon one of the sections, a link pivotally connected at one end to one arm of the lever and at its other end to the end of the other section, a rock shaft supported by the first mentioned section, a rocker arm projecting from said shaft, a link connecting the other arm of the bell crank lever and the rocker arm, means to rotate said shaft to draw the ends of the sections together, other means to limit the movement of the last mentioned means in one direction supported on the first mentioned section, and means to hold the limiting means in adjusted position on said section and thereby vary the movement of the first mentioned means.

2. In combination with pipe sections respectively including male and female ends, a bell-crank lever fulcrumed upon one of the sections, a link pivotally connected at one end to one arm of the lever and at its other end to the end of the other section, a rock shaft supported by the first mentioned section, a rocker arm projecting from said shaft, a link connecting the other arm of the bell crank lever and the rocker arm, a hand lever connected to said shaft to rotate therewith, a stop element carried by said first mentioned section to limit the movement in one direction of said hand lever and means to secure said stop element in adjusted position on its section whereby the movement of said hand lever may be varied.

3. In combination with pipe sections respectively including male and female ends, spaced clamps carried by one of said sections, a bell-crank lever fulcrumed at its angle upon one of the clamps, a link pivotally connected at one end to one arm of the lever and provided at its other end with spaced hooks, lugs carried by the end of the other section for selective engagement by said hooks, a rock shaft supported by the other clamp, a rocker arm projecting from said shaft, a link connecting the other arm of the bell crank lever and the rocker arm, a hand lever fixed to said shaft, a clamp mounted on the first mentioned section and movable to and from said shaft, bolts extending through said clamp to hold the same in adjusted position on the section, and a stop arm extending from said last mentioned clamp and lying in the path of said lever.

4. In combination with pipe sections respectively including male and female ends, spaced clamps carried by one of said sections, each clamp including a thickened connecting portion having an opening formed therein and disposed transversely of said sections, rock shafts respectively mounted in the openings of said clamps, a bell-crank lever fixedly secured at its angle to each end of one of the rock shafts, links respectively pivotally connected at one end to one arm of each lever and at the other end to the end of the other section, a rock arm connected to each end of the other rock shaft, links respectively connecting the other arms of the bell crank levers and the rocker arms, a lever connected to the last mentioned shaft to rotate therewith, a stop element carried by said first mentioned section to limit the movement in one direction of said lever and means to rock said stop element in adjusted position in its section.

In testimony whereof I affix my signature, in the presence of two witnesses.

PAUL W. LANGILLE.

Witnesses:
MARY L. INGLIS,
D. FRANK MATHESON.